United States Patent [19]
Sato

[11] Patent Number: 5,362,011
[45] Date of Patent: Nov. 8, 1994

[54] BAITCASTING REEL HAVING AN IMPROVED CENTRIFUGAL BRAKE

[75] Inventor: Jun Sato, Osaka, Japan

[73] Assignee: Shimano Inc., Osaka, Japan

[21] Appl. No.: 989,816

[22] Filed: Dec. 14, 1992

[30] Foreign Application Priority Data

Dec. 16, 1991 [JP] Japan .............................. 3-103201[U]
Jun. 22, 1992 [JP] Japan .............................. 4-42824[U]

[51] Int. Cl.5 .......................................... A01K 89/033
[52] U.S. Cl. ...................................... 242/289; 242/314
[58] Field of Search ................ 242/289, 310, 323, 314

[56] References Cited

U.S. PATENT DOCUMENTS

| | | | |
|---|---|---|---|
| 2,482,863 | 9/1949 | Nelson | 242/289 |
| 2,967,676 | 1/1961 | Klingberg | 242/289 |
| 3,986,678 | 10/1976 | Coquelet et al. | 242/289 |
| 4,209,141 | 6/1980 | Karlsson | 242/289 |
| 4,728,052 | 3/1988 | Yeh | 242/323 X |
| 4,917,321 | 4/1990 | Roberts | 242/289 |
| 5,120,002 | 6/1992 | Kawai | 242/314 |
| 5,127,603 | 7/1992 | Morimoto | 242/310 X |

FOREIGN PATENT DOCUMENTS 30-8116 11/1955 Japan .
56-41120 9/1981 Japan .
137333 9/1952 Sweden .............................. 242/289

Primary Examiner—Daniel P. Stodola
Assistant Examiner—Michael R. Mansen
Attorney, Agent, or Firm—Dickstein, Shapiro & Morin

[57] ABSTRACT

A centrifugal brake for a baitcasting reel has contact pieces in the form of collars slidably mounted on rods extending radially of a spool axis to be revolvable with rotation of a spool, and an annular braking member disposed outwardly of a locus of revolution of the collars. The braking member is attached to an inner periphery of a case or cover detachably attached to a reel frame. The collars are movable under a centrifugal force into contact with the braking member. The braking member has an inclined surface formed on an inner periphery thereof. The inclined surface is opposed to the spool and shaped to diverge toward the spool. In the course of attaching the case or cover to the reel frame, the inclined surface pushes the collars down toward the spool axis to facilitate a case attaching operation.

22 Claims, 11 Drawing Sheets

BAITCASTING REEL HAVING AN IMPROVED CENTRIFUGAL BRAKE

BACKGROUND OF THE INVENTION

1. Field of the Invention

This invention relates to baitcasting reels, and more particularly to a baitcasting reel having a centrifugal brake. The centrifugal brake includes contact pieces displaceable radially of a spool rotatable about its axis or a member rotatable with the spool, and an annular braking member disposed coaxially of the spool and outwardly of a locus of revolution of the contact pieces.

2. Description of the Related Art

A known centrifugal brake as constructed above is disclosed in Japanese Patent Publication No. 30(1955)-8116, for example. This centrifugal brake includes rods extending radially of a spool shaft rotatable with a spool, collars (braking pieces) slidably mounted on the rods, respectively, and an annular braking member secured to a reel body. When the spool rotates, the collars move under a centrifugal force into pressure contact with the inner peripheral wall of the braking member, thereby to apply a braking force to the spool rotation.

Baitcasting reels today employ centrifugal brakes having basically the same construction as the above prior art brake. The collars are formed of plastic, while the braking member is formed of metal. Some baitcasting reels commerically available today employ centrifugal brakes whose braking force is adjustable by changing the collars.

In a sequence of assembling a baitcasting reel having the conventional brake construction, the collars are fitted on the rods revolvable with rotation of the spool shaft, and thereafter the braking member is placed peripherally of the collars by moving the spool and braking member toward each other.

The collars in this type of brake are relatively small, and outer ends of the rods are disposed close to the inner peripheral wall of the braking member. Consequently, the assembly process noted above sometimes fails to produce a desired result, owing to contact between the rods and braking member or between the collars and braking member occurring when the braking member or spool is moved axially of the spool shaft.

If the collars protrude from the outer ends of the rods during assembly, the collars will contact the braking member even if the components supporting the collars and the component supporting the braking member are placed in a proper relative relationship. This will make it impossible to move the braking member and spool to predetermined positions. Thus, the braking member and spool are moved to the predetermined positions after the collars are pushed in with fingers.

In some reel constructions, a side case is removable from the reel body to allow change of the collars. This side case supports the braking member, while the reel body supports the spool and collars. For the same reason as noted above, the collars protruding from the outer ends of the rods may be obstructive to a case attaching operation and insertion of the spool. There is room for improvement.

SUMMARY OF THE INVENTION

An object of the present invention is to provide a baitcasting reel having a centrifugal brake, which may be assembled in a convenient manner by arranging contact pieces and a braking member in predetermied positions in an easy operation even when the contact pieces and braking member are contactable with each other.

Another object of the invention is to provide a baitcasting reel having a case detachably attached to a frame, in which a simple modification is made to a coupling structure for coupling the case to the frame to facilitate attachment and detachment of the case, while allowing maintenance of the collars and removal of the spool to be carried out with ease.

A further object of the invention is to provide a baitcasting reel which allows supplementary contact pieces to be stored easily as spares for replacement by utilizing a structure inherent to the reel, and which facilitates change of the contact pieces.

The above object is fulfilled, according to the present invention, by a baitcasting reel comprising a spool rotatable about an axis, or a member rotatable about the axis with the spool; contact pieces mounted on the spool or the member rotatable with the spool, to be displaceable in directions perpendicular to the axis; an annular braking member disposed coaxially with the axis and outwardly of a locus of revolution of the contact pieces; and an inclined surface formed on an inner periphery of the braking member or an inner periphery of a member continuous with the braking member opposed to an end of the spool, the inclined surface being shaped to diverge toward the spool.

This baitcasting reel has the following functions and effects.

The above features may be arranged as shown in FIGS. 1 and 2, for example. When moving a braking member 38 toward a spool 3, the braking member 38 is moved along an axis X of a spool shaft 19 even if contact pieces 37 protrude to an extent of contacting an end of the braking member 38. Then, the contact pieces 37 contact an inclined surface T of the braking member 38. As the braking member 38 is moved, the contact pieces 37 are guided by the inclined surface T to an inner peripheral surface 38S of the braking member 38.

A slight misalignment may occur between the contact pieces 37 and braking member 38, so that rods 36 supporting the contact pieces 37 contact the braking member 38. By moving the braking member 38 along the axis X of the spool shaft 19, with the misalignment maintained as it is, outer ends of the rods 36 will contact the inclined surface T of the braking member 38, thereby guiding the braking member 38 to a proper position.

Thus, the present invention provides a simple modification in shape consisting in the inclined surface T formed at an end of the braking member 38. This simple modification facilitates an operation to push in the contact pieces 37 despite a slight misalignment between the contact pieces 37 and braking member 38, and an operation to assemble the brake without requiring a correction in the relative position therebetween.

The centrifugal brake for a baitcasting reel according to the present invention may be assembled in a convenient manner by arranging the contact pieces and braking member in predetermined positions in an easy operation even when the contact pieces and braking member are contactable with each other.

The contact pieces may be in the form of collars slidably mounted on the rods, an amount of protrusion of the collars from the rods being limited by stoppers.

The inclined surface may have a maximum radius enveloping outermost positions to which the collars are allowed to protrude by the stoppers. This construction allows assembly without requiring a special trouble of depressing the collars.

Further, the baitcasting reel according to the present invention may be constructed as follows.

The braking member is mounted on an inner surface of a case detachably attached to a frame disposed adjacent the spool, the frame and the case including engaging pieces and lugs switchable between a tight engaging state and a loosened state through a relative revolution therebetween about the axis of the spool.

This construction has the following functions and effects.

The case may be detached from the frame to facilitate maintenance of the contact pieces and braking member. One side of the reel may be closed, or the spool may be inserted easily and quickly. The coupling structure formed of the engaging pieces and lugs facilitates attachment and detachment of the case to/from the frame.

Further, the braking member and contact pieces may be disposed adjacent an opening formed in the frame, and a storage may be formed in a position between the frame and the case detachably attached to the frame, for accommodating supplementary contact pieces acting as spares.

With this construction, the case is detached to change the contact pieces, the supplementary contact pieces may be taken out of the case or frame for replacement. The contact pieces replaced may be placed in the storage. Thus, this construction provides the following advantages:

(1) The supplementary contact pieces need not be kept in the angler's pocket or the like. The above construction minimizes the chances of losing the supplementary contact pieces.
(2) Contact pieces suited to the reel may be kept in the storage formed in the reel per se. This precludes the possibility of a mistake of attaching contact pieces of a wrong or unmatched design, to assure a proper braking function.
(3) The contact pieces may be taken out of the storage or may be changed simply by detaching the case. The reel has excellent operability for change of the contact pieces.

The foregoing and other objects, features and advantages of the invention will be apparent from the following more particular description of preferred embodiments of the invention, as illustrated in the accompanying drawings.

BRIEF DESCRIPTION OF THE DRAWINGS

The drawings show baitcasting reels embodying the present invention, in which.

DETAILED DESCRIPTION OF THE PREFERRED EMBODIMENTS

A baitcasting reel according to the present invention will be described in detail with reference to the drawings.

Figure 3:
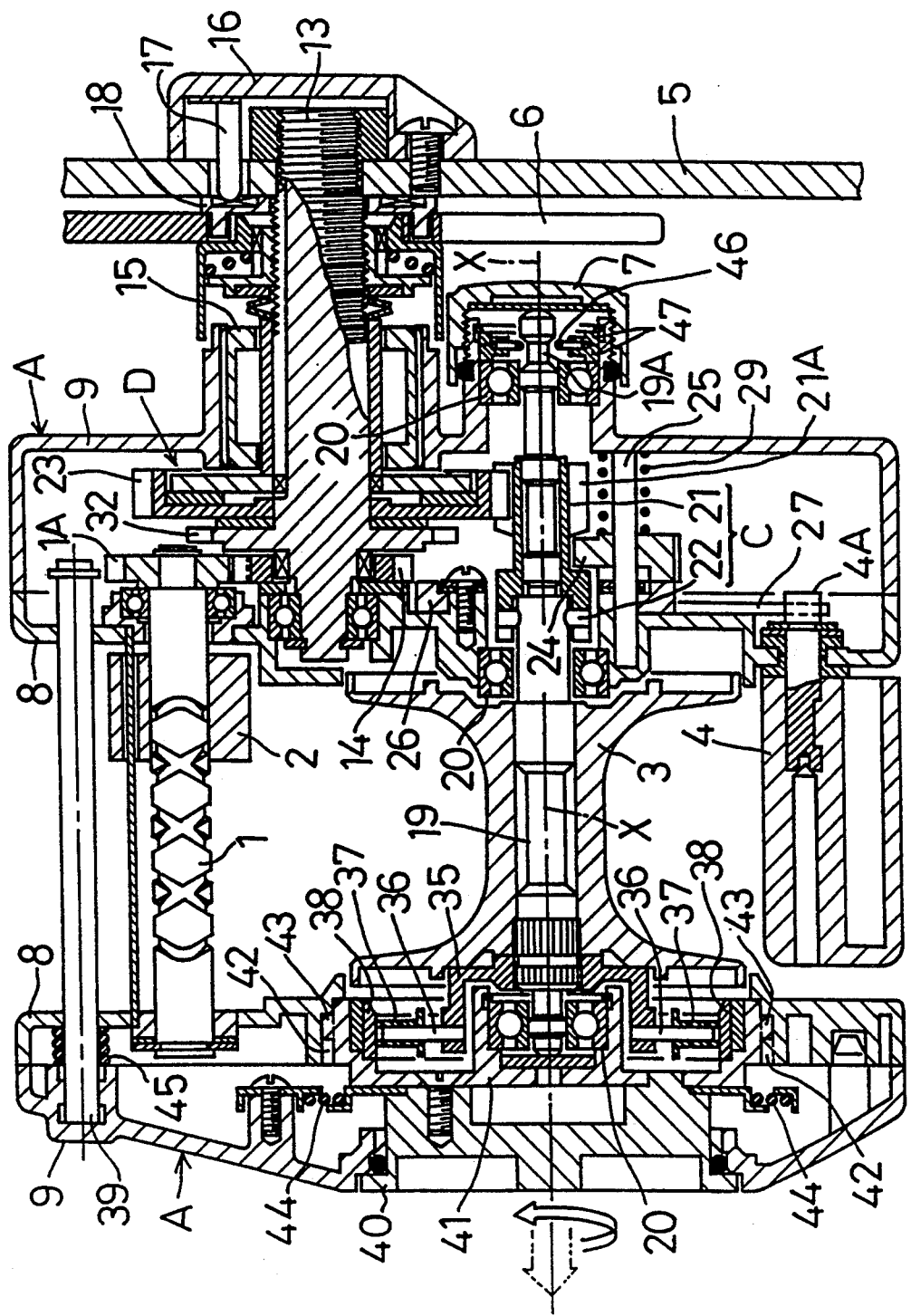
FIG. 3 is a plan view in cross section of a baitcasting reel.
Figure 4:
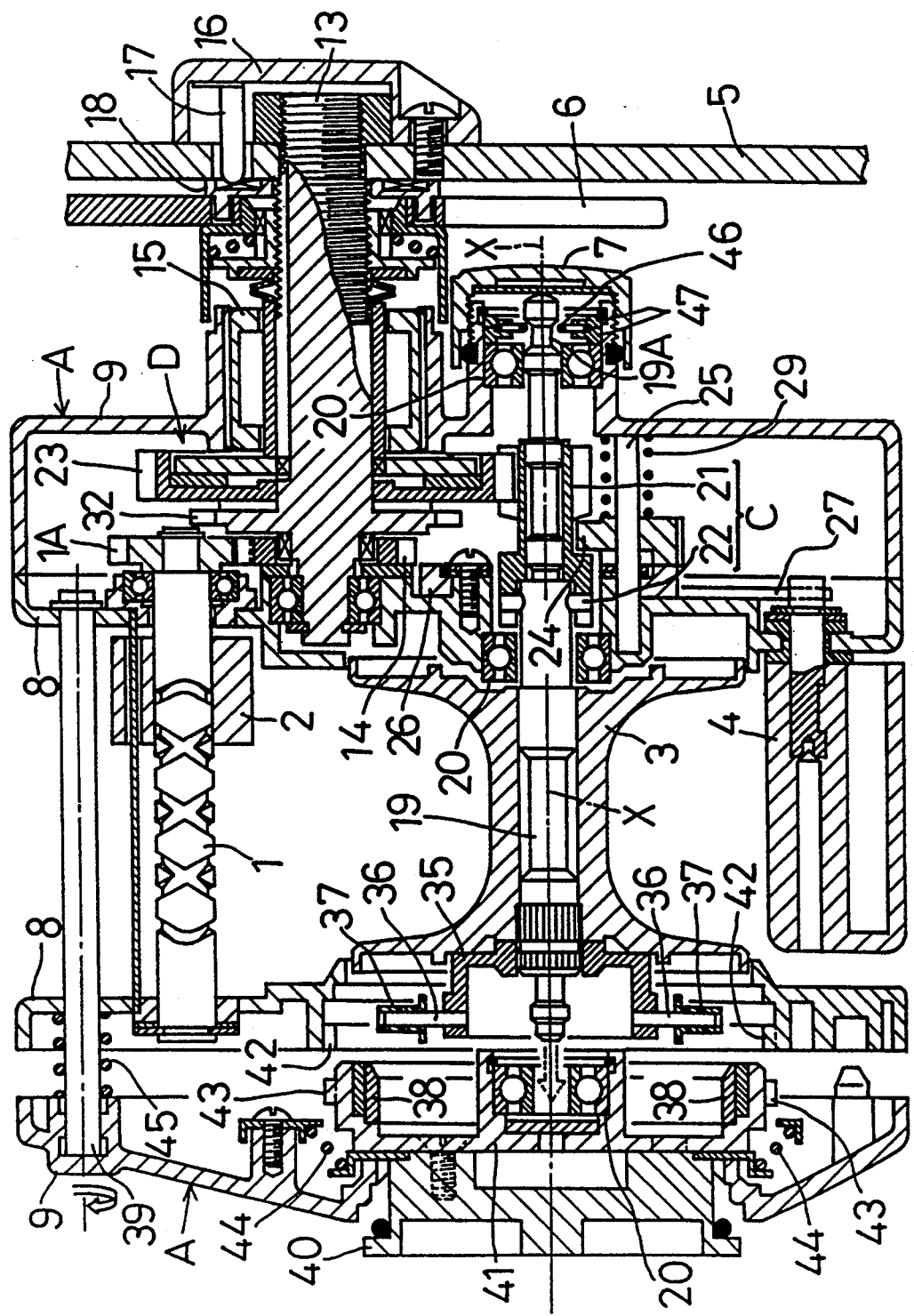
FIG. 4 is a plan view in cross section of the reel with a case opened.
Figure 5:
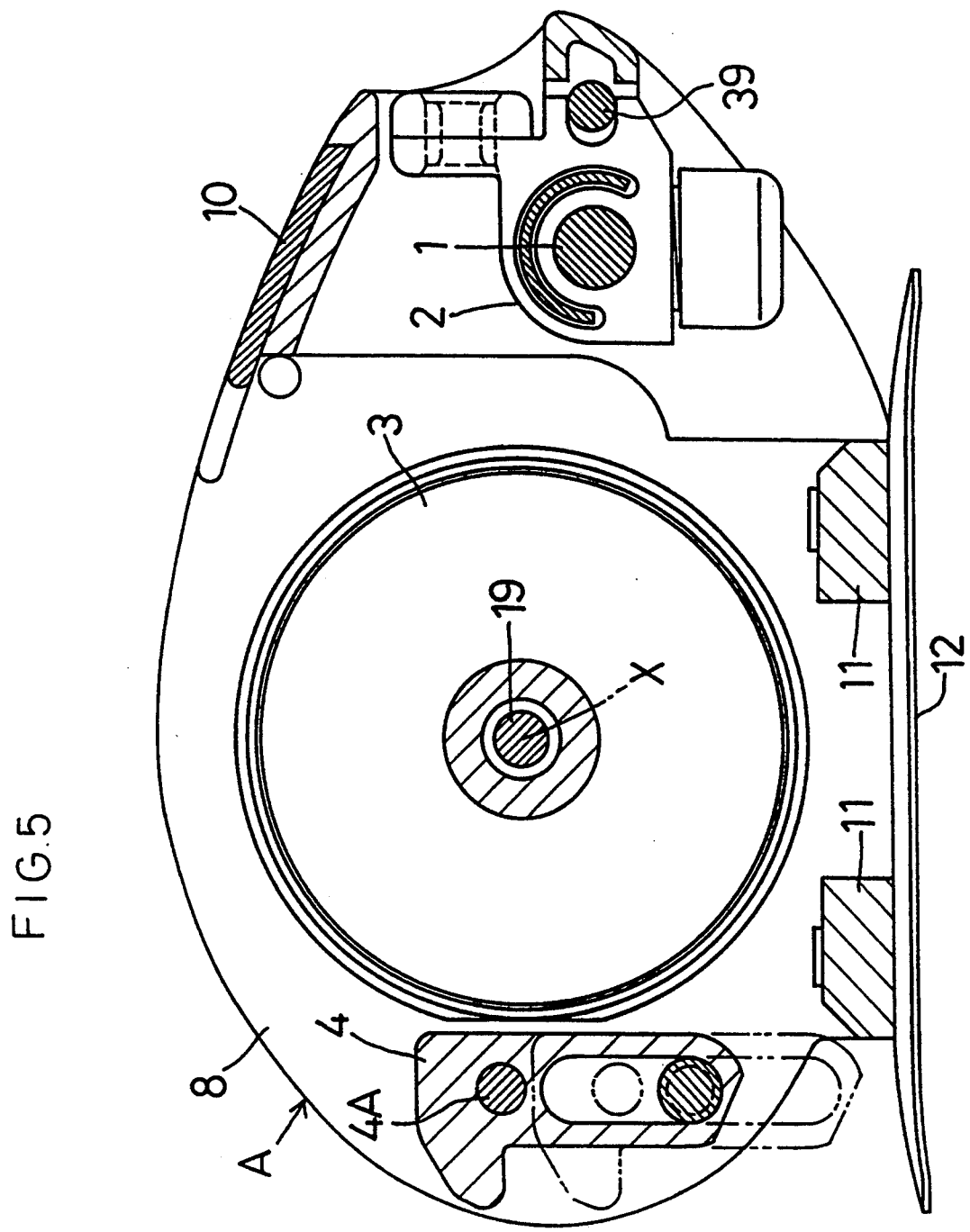
FIG. 5 is a side view in vertical section of the reel.

As shown in FIGS. 3 through 5, a baitcasting reel comprises right and left side bodies A supporting therebetween a level wind mechanism mounted in a forward position, a spool 3 mounted in a middle position, and a clutch controller 4 mounted in a rearward position. The level wind mechanism includes a screw shaft 1, and a line guide 2 reciprocable with rotation of the screw shaft 1. The fight side body A supports a handle 5, a drag controller 6, and a cast controller 7.

Each of the right and left side bodies A is formed of an inner frame 8 and a case 9 covering an outer part of the inner frame 8. The right and left inner frames 8 are formed integral with an upper thumb rest 10 and a pair of lower frames 11. A foot 12 extends between the lower frames 11.

The right side body A rotatably supports a handle shaft 13 carrying the handle 5 and drag controller 6. Further, the handle shaft 13 carries a drag mechanism D and an output gear 14 mounted on an inward portion thereof. A roller type one-way clutch 15 is mounted between the handle shaft 13 and right case 9 to prevent backward turning of the handle 5. Drive from the handle 5 is transmitted through the output gear 14 to an input gear 1A mounted on the screw shaft 1.

A disk 18 is disposed on a side of the drag controller 6 opposed to the handle 5. A plate spring 17 is attached to a retainer 16 of the handle 5 for engaging the disk 18 to produce a clicking sound. The clicking sound notifies the angle of an amount of operation of the drag controller 6.

A clutch mechanism C includes a clutch sleeve 21 slidably mounted on a spool shaft 19 supported by a plurality of bearings 20 to be rotatable with the spool 3, and a pin 22 fixed to the spool shaft 19 to engage the clutch sleeve 21. The clutch sleeve 21 has an input gear 21A meshed with an output gear 23 of the drag mechanism D. With this spool rotating system, torque from the handle 5 is transmitted to the spool 3 through the drag mechanism D and clutch mechanism C.

Figure 6:
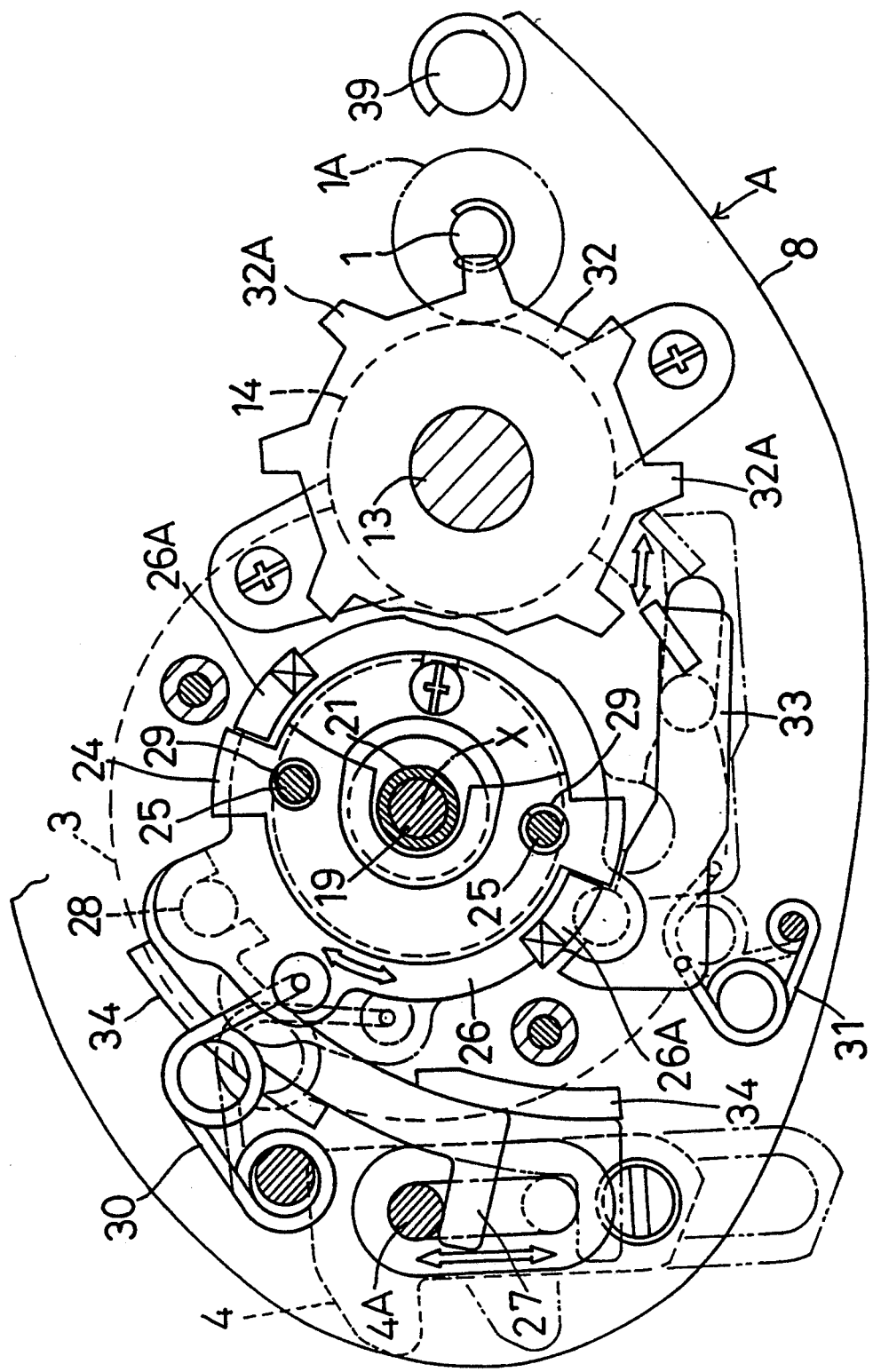
FIG. 6 is a side view of a clutch operating system.

As shown in FIG. 6, the clutch sleeve 21 is engaged with a yoke 24 slidably supported on a pair of support shafts 25. A rotary cam 26 is rotatably mounted coaxially with an axis X of the spool 3. This rotary cam 26 defines a pair of cam surfaces 26A for contacting the yoke 24 and operating the clutch sleeve 21 through the yoke 24. The rotary cam 26 has an engaging pin 28 engaged with a link element 27. The link element 27 is operable through contact with a control pin 4A of the clutch controller 4.

Compression springs 29 are mounted on the support shafts 25 to bias the yoke 24 to a position to engage the clutch mechanism C. A toggle spring 30 acts on the rotary cam 26 to maintain the rotary cam 26 in a position to engage or a position to disengage the clutch mechanism C. A further toggle spring 31 acts on a return arm 33 interlocked to the rotary cam 26. When the clutch mechanism C is disengaged, the return arm 33 is switched to a position in which an end thereof interferes with a return control wheel 32.

When disengaging the clutch mechanism C, the clutch controller 4 is depressed to apply an operating force to the link element 27 through the pin 4A formed on the clutch controller 4. Then the link element 27 moves describing an arcuate locus along a guide 34, to rotate the rotary cam 26. As a result, the clutch sleeve 21 moves toward a disengaged position through pressure contact with the cam surfaces 26A. When engaging the clutch mechanism C, the handle 5 is turned in a direction to take up the fishing line. This causes a tooth 32A of the wheel 32 to push the return arm 33, thereby rotating the rotary cam 28 in a clutch engaging direction. Consequently, the yoke 24 moves under the biasing force of compression springs 29 to the position to engage the clutch mechanism C.

Figure 1:
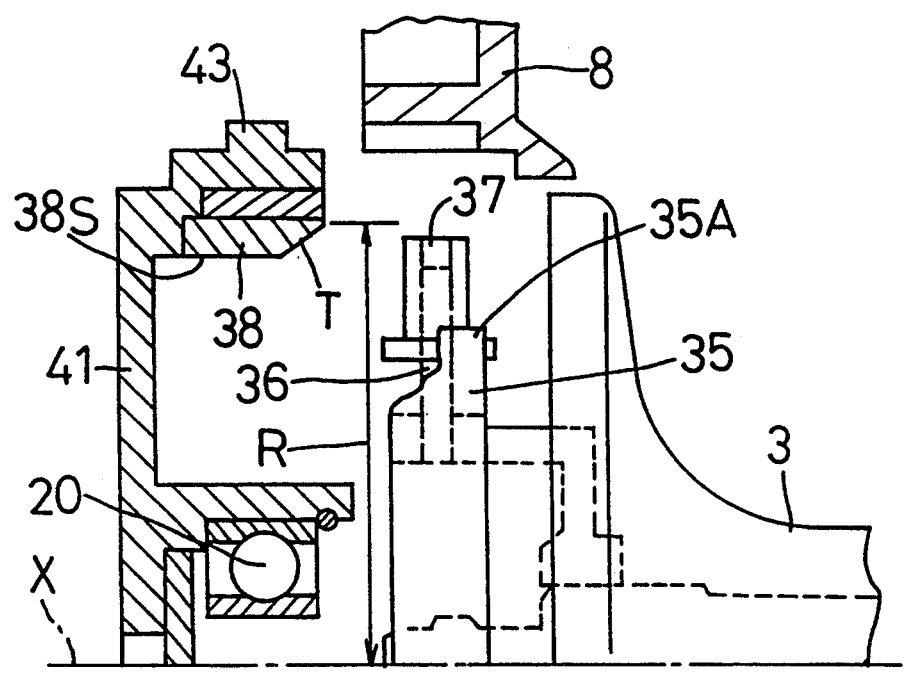
FIG. 1 is a sectional view of a centrifugal brake with a braking member separated.
Figure 2:
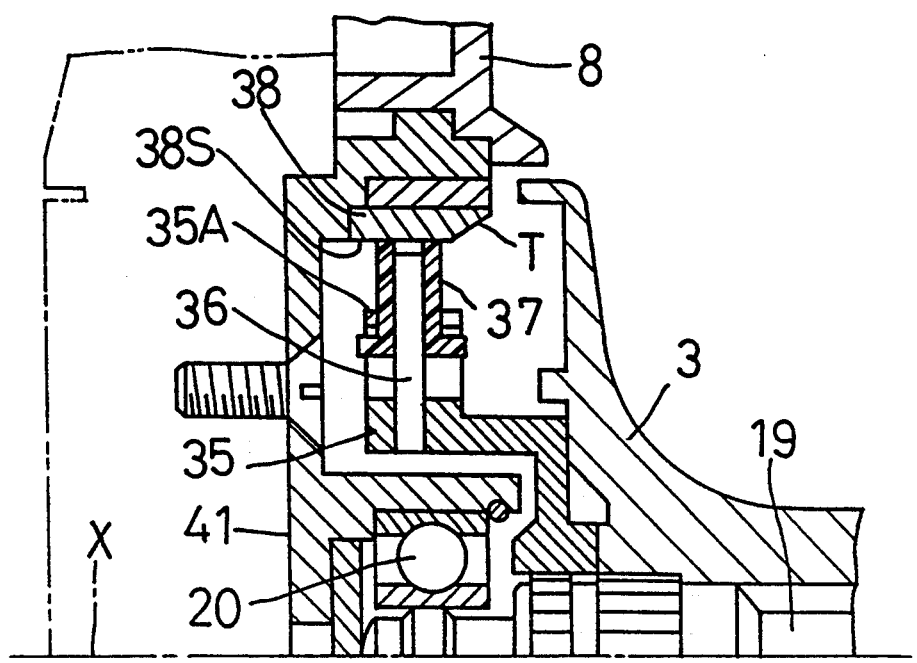
FIG. 2 is a sectional view of the centrifugal brake in an assembled state.
Figure 8:
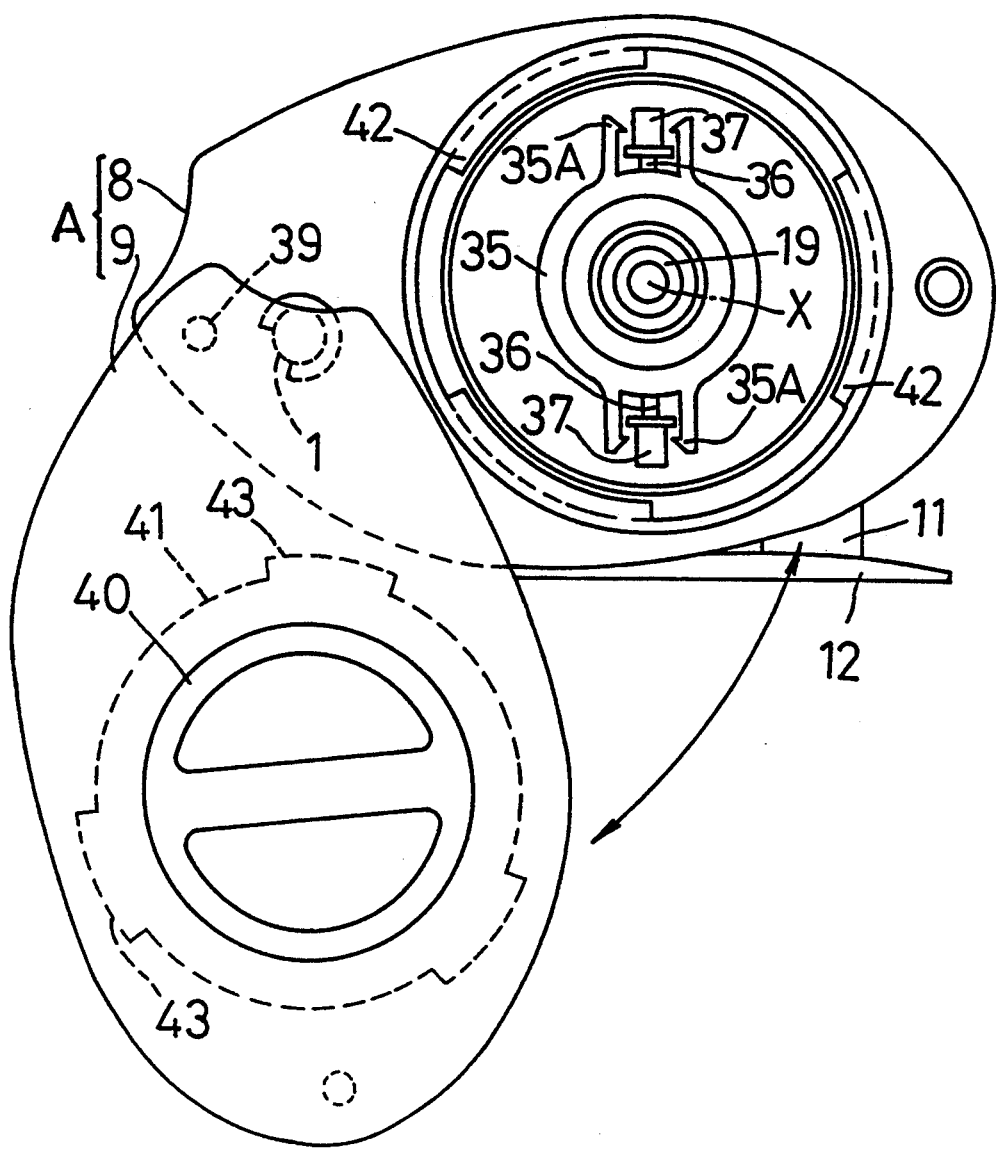
FIG. 8 is a side view of the reel with the case opened.

As shown in FIGS. 1, 2 and 8, the left side body A contains a centrifugal brake including collars (contact pieces) 37 formed of plastic and an annular braking member 38 formed of metal. The plastic collars 37 are slidably mounted on a pair of rods 36 extending from a plastic holder 35 fixed to the spool shaft 19.

The braking member 38 is disposed outwardly of a locus of revolution of the collars 37. The holder 35 has stoppers 35A formed integral therewith to prevent the collars 37 from falling off the rods 36.

The braking member 38 has an inner peripheral surface 38S including an inclined surface T formed at an end opposed to the spool 3. The inclined surface T diverges toward the spool 3. The inclined surface T has an angle of inclination about 45 degrees or less with respect to a reference line parallel to the axis X. The inclined surface T is designed to facilitate closure of the left case 9, as described later, when the collars 37 protrude from the outer ends of the rods 36 to contact the braking member 38. During a case closing operation to push in the case 9 toward the spool 3, a small diameter portion of the inclined surface T gradually pushes outer ends of the collars 37 to shift the collars 37 toward the inner peripheral surface of the braking member 38.

The inclined surface T has a maximum radius R enveloping outermost positions to which the collars 37 are allowed to protrude by the stoppers 35A.

As shown in FIGS. 3 and 4, the left case 9 has a knob 40 rotatable about the axis X of the spool shaft 19 to be shifted along the axis X. The knob 40 has a disk-like member 41 rigidly connected thereto. The disk-like member 41 includes one of the bearings 20 for supporting the spool shaft 19, and the braking member 38.

As shown in FIG. 8, the disk-like member 41 has a plurality of lugs 43 formed on an inner peripheral surface thereof, while the frame 8 has engaging pieces 42 formed peripherally of a circular opening to be engageable with the lugs 43. When the knob 40 is rotated about the axis X of the spool shaft 19, the engaging pieces 42 and lugs 43 are engaged or disengaged to switch between a state of fixing the case 9 to the frame 8 and a state of separating the case 9 from the frame 8. After the separation, the left case 9 is pivotably supported by a front support axis 39 without falling off the reel. With the case 9 separated, the side of the frame 8 is wide open to allow removable of the spool 3.

The engaging pieces 42 and lugs 43 are engageable and disengageable by a rotation through a relatively small angle in the order of 10 to 30 degrees. When the case 9 is separated, as shown in FIG. 4, the knob 40 and disk-like member 41 are pushed out by a biasing force of a spring 44, and the case 9 is pushed away from the frame 8 by a spring 45 fitted on the support axis 39.

Figure 7:
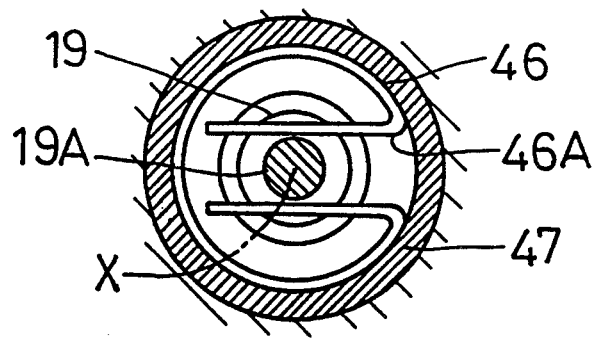
FIG. 7 is a sectional view showing a spring configuration.

This reel further includes a retainer mechanism for preventing the spool 3 from falling off by gravity when the case 9 is opened in the above operation. As also shown in FIG. 7, the retainer mechanism includes a small diameter portion formed adjacent an end of the spool shaft 19 disposed in the right side body A, a spring 46 having a pair of engaging portions 46A opposed to each other across and engaging the small diameter portion 19A of the spool shaft 19, and an annular holder 47 for supporting the spring 46.

In use, the case 9 may be opened in a one-touch operation of the knob 40. Even when the open side is placed downward, the spring 46 prevents the spool 3 from falling off (though the spool 3 may be removed manually). The case 9 may be closed simply by pushing in the case 9 along the axis X. The closing operation may be completed easily without a special or additional operation even if the collars 37 protrude from the outer ends of the rods 36. That is, the inclined surface T moves the collars 37 inwardly at this time.

Other embodiments will be described hereinafter.

Figure 9:
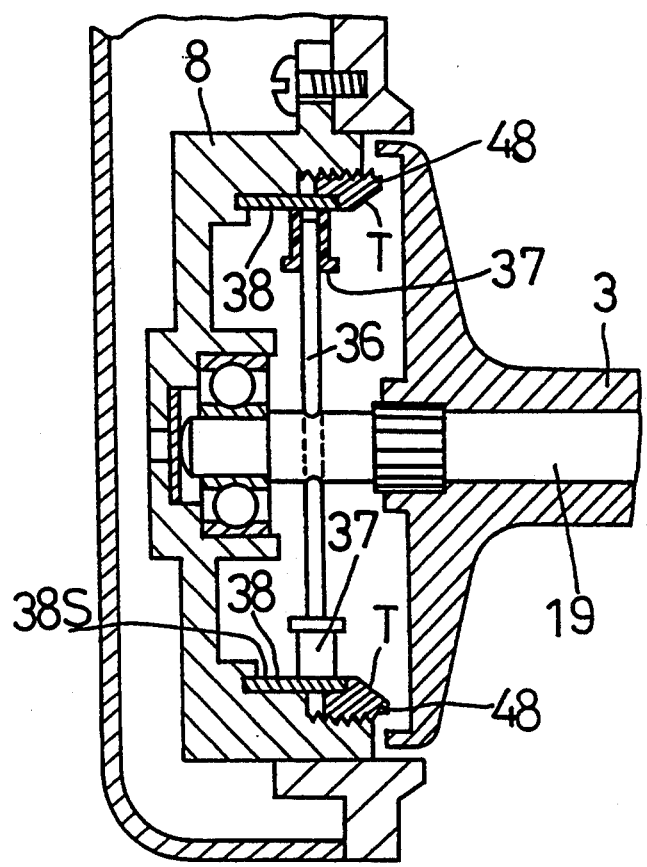
FIG. 9 is a sectional view of a brake in another embodiment.

(1) The above embodiment may be modified such that, as shown in FIG. 9, the spool shaft 19 supports a rod 36 extending directly therethrough.

(2) A ring 48 may be screwed to the inner frame 8 to prevent the braking member 38 fitted in the frame 8 from falling off the frame 8. The ring 48 screwed to the frame 8 has an inner peripheral surface continuous with the inner peripheral surface 38S of the braking member 38. The ring 48 has an inclined surface T defined at an end thereof opposed to the spool 3 and diverging toward the spool 3. Thus, the inclined surface T may be formed separately from the braking member 38.

(3) The present invention is applicable also to a reel not adapted to open laterally of the spool. The described centrifugal brake may be disposed at the right side of the spool opposed to the handle. The contact pieces are not limited to the slide type, but may be pivotable in and out about axes, for example.

(4) The centrifugal brake may have a multiplicity of rods extending radially of the spool shaft, and a multiplicity of collars (contact pieces) mounted on the respective rods. Further, the centrifugal brake may be modified to include a braking member supported on the reel body, and collars (contact pieces) removable with the spool. Where the collars are removable with the spool, the latter may be mounted in place quickly with no obstruction presented by the collars and other components.

Figure 10:
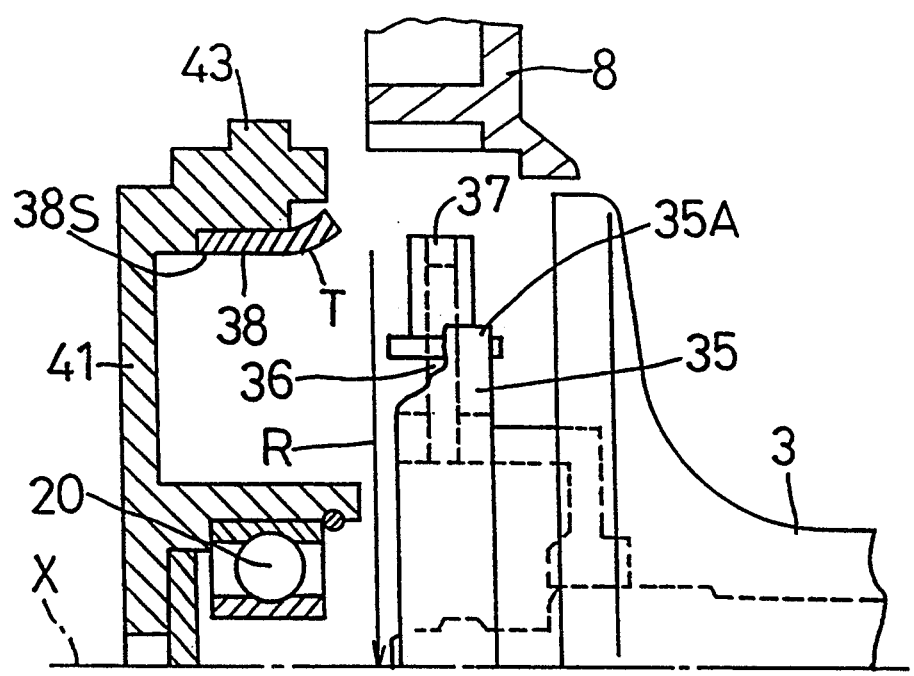
FIG. 10 is a sectional view of a brake in a further embodiment.

(5) As shown in FIG. 10, the inclined surface T may diverge in an arcuate shape.

Figure 14:
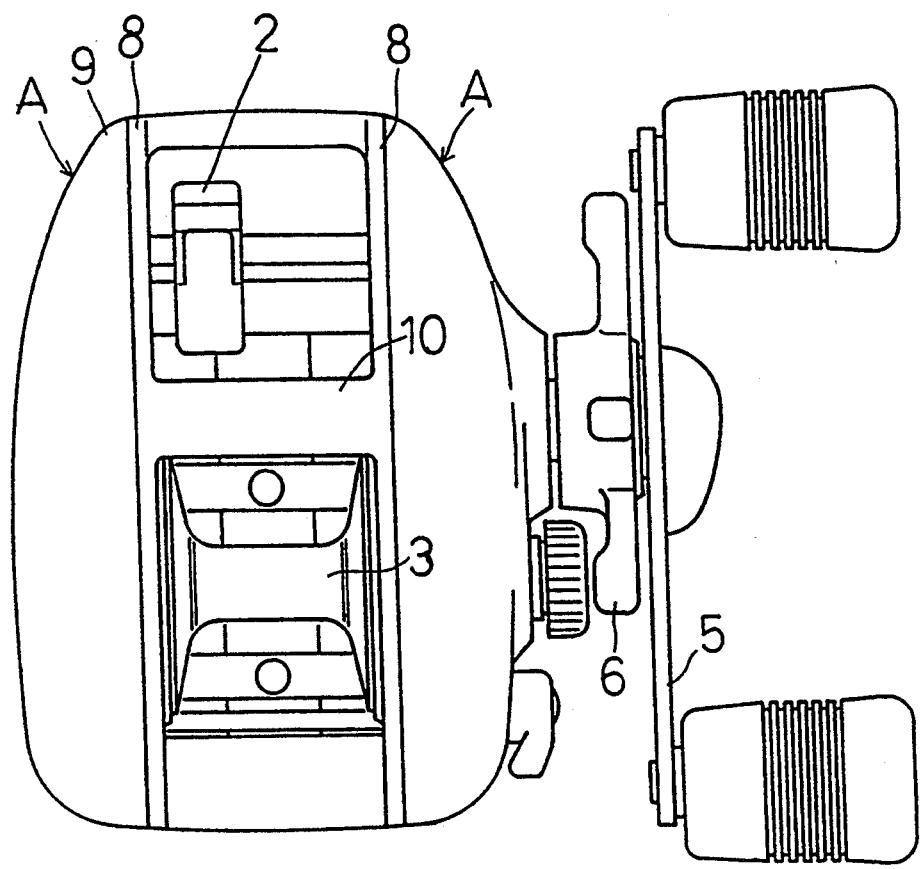
FIG. 14 is a plan view of the baitcasting reel shown in FIGS. 11 through 13.

(6) A baitcasting reel having a different construction to the above will be described. As shown in FIG. 14, this baitcasting reel has a right side body A supporting a line winding handle 5 and a drag controller 6. A left side body A is disposed opposite the right side body A with a spool 3 mounted in between.

The left side body A includes a left case 9 and a left frame 8. The left frame 8 is connected to a right frame 8 of the right side body A through a thumb rest 10, to interconnect the right side body A and left side body A.

Figure 11:
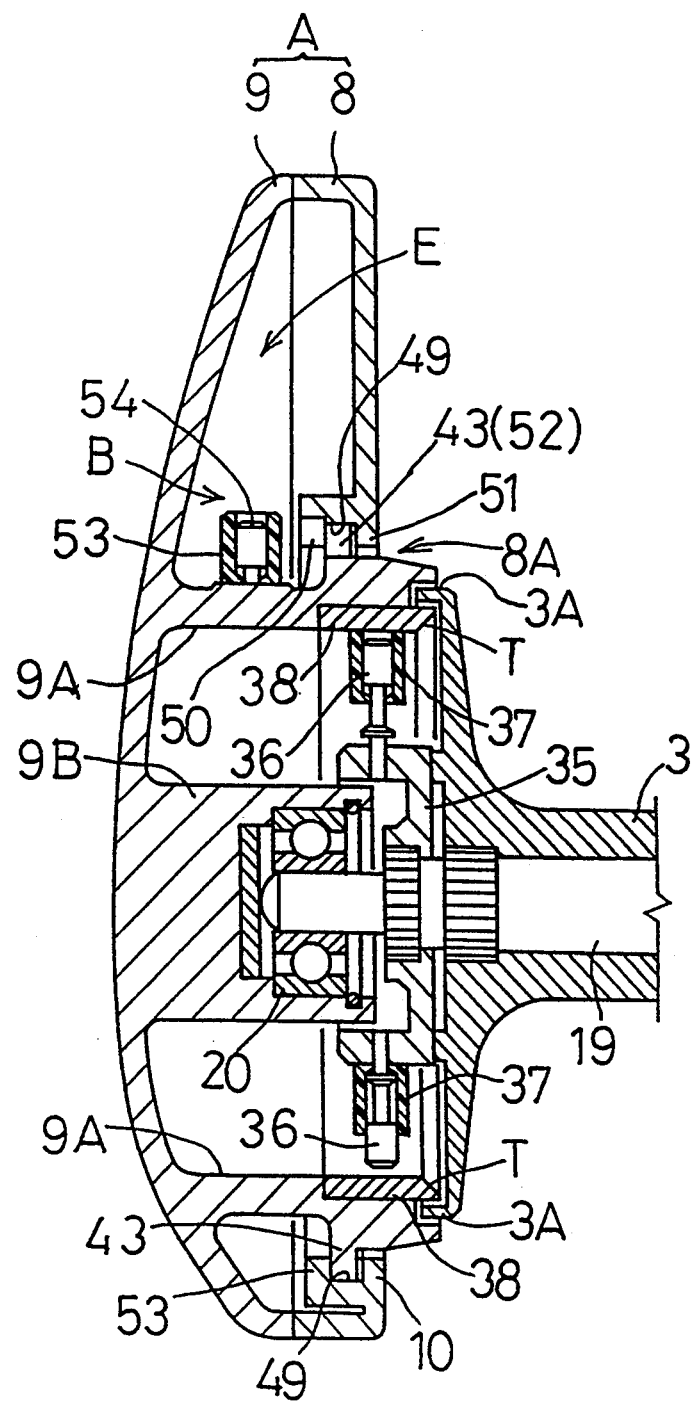
FIG. 11 is a rear view in vertical section of a left side body of a baitcasting reel different from the reel shown in FIG. 5.
Figure 12:
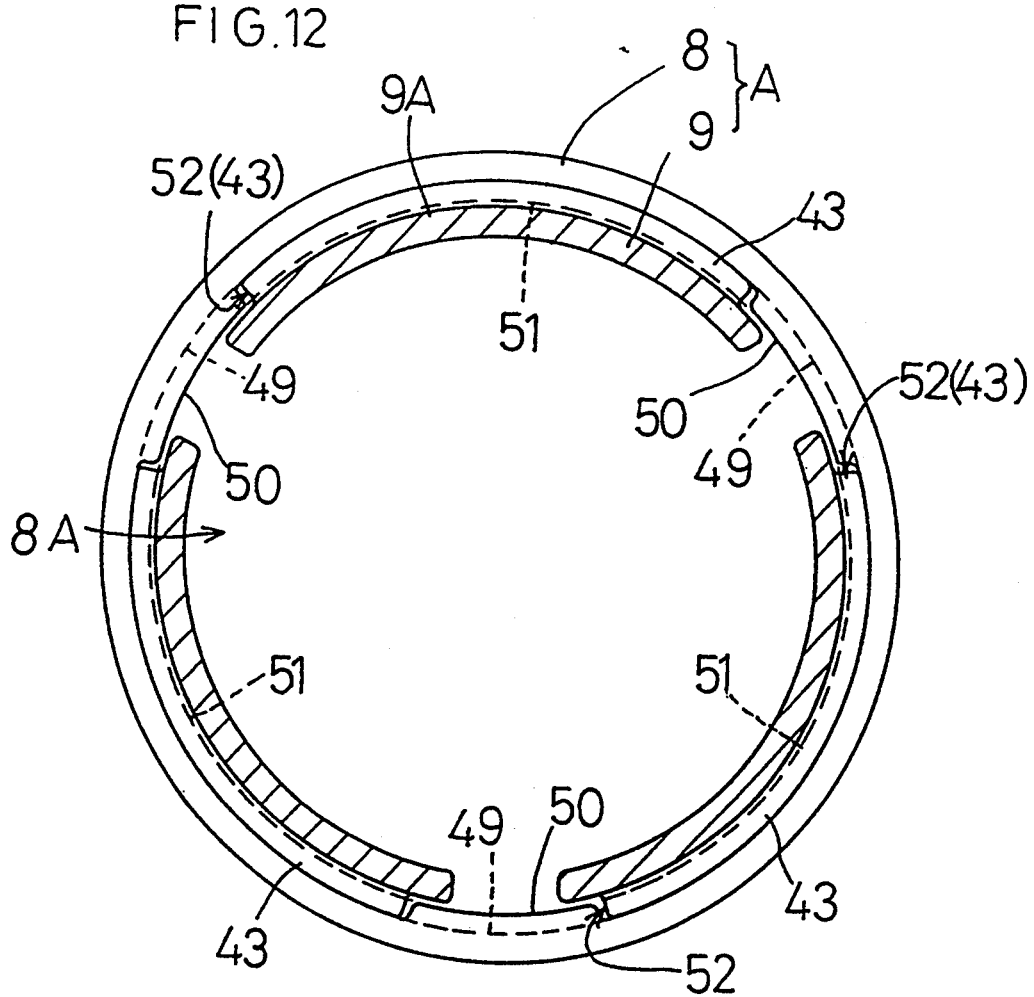
FIG. 12 is a side view in vertical section showing a coupling structure of a case shown in FIG. 11.

The left side body A will be described next. As shown in FIG. 11, the left case 9 includes a boss 9B extending inwardly from an inner wall thereof, and a bearing 20 is fitted in the boss 9B to support one end of a spool shaft 19. The left case 9 further includes a cylindrical portion 9A surrounding the boss 9B and similarly extending inwardly from the inner wall of the left case 9. The cylindrical portion 9A extends through an opening 8A formed in the left frame 8, to a position adjacent an outer peripheral surface of a flange 3A of the spool 3.

As shown in FIG. 11, a centrifugal brake mechanism includes a braking member 38 formed on an inner peripheral surface of the cylindrical portion 9A, rods 36 extending from a holder 35 mounted on the spool shaft 19 to be rotatable therewith, and collars 37 slidably fitted on the rods 36, respectively. With rotation of the spool shaft 19, the centrifugal brake mechanism operates with the collars 37 acting on the braking member 38. Each rod 36 includes small diameter portions and large diameter portions arranged alternately, and each collar 37 includes an elastic engaging element extending inwardly. With this construction, when the elastic engaging element is positioned on a small diameter portion adjacent the spool axis, the collar 37 is maintained in an inoperative position immovable under a centrifugal force. The collar 37 may be pushed up to the next small diameter portion to switch to an operative position for acting on the braking member 38 under the centrifugal force. As shown in FIG. 11, one of the collars 37 may be placed in the operative position, while the other collar 37 is placed in the inoperative position. This produces a braking force smaller than when both collars 37 are placed in the operative position. The number of rods 36 extending from the holder 35 may be increased to realize finer stages of brake adjustment.

Figure 13:
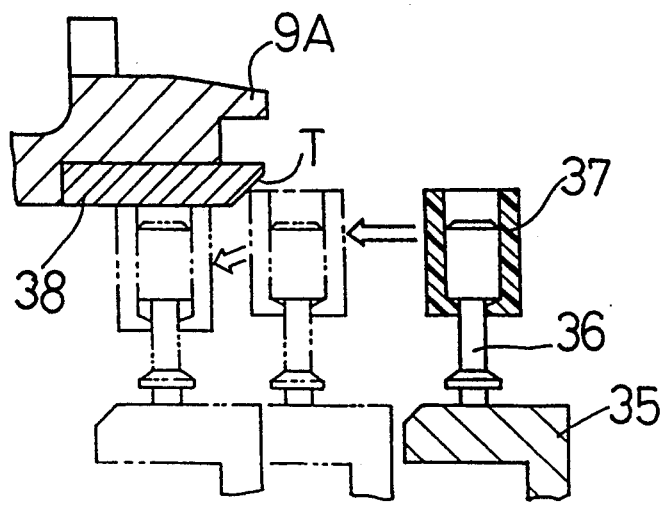
FIG. 13 is a rear view in vertical section showing a positional relationship between contact pieces and a braking member during attachment of the case shown in FIG. 11.

As shown in FIG. 11, the braking member 38 defines an inclined surface T at a forward end thereof. The inclined surface T has a maximum radius R enveloping outer surfaces of the collars 37 in the operative position which is an outermost position of the collars 37. When attaching the left case 9, as shown in FIG. 13, the inclined surface T depresses the collars 37 from the outermost position to smooth attachment of the left case 9. The inclined surface T is effective to avoid deformation of the rods 36 which could occur in the absence of the inclined surface T as a result of a twisting force produced through contact between an edge of the braking member 38 and the collars 37.

A coupling structure for detachably attaching the left case 9 to the left frame 8 will be described next. As shown in FIG. 11, the coupling structure includes engaging pieces 50 and lugs 43. The opening 8A of the left frame 8 is surrounded by a thick edge having an annular engaging recess 49. The engaging recess 49 is defined by right and left side walls. The side wall opposed to the case 9 is not continuous in the circumferential direction, but is in the form of three plate-like projections 50 arranged circumferentially. The other side wall is a circumferentially continuous wall 51. The plate-lie projections 50 and continuous wall 51 define the engaging recess 49 therebetween. The lugs 43 are arranged circumferentially on an outer peripheral surface of the cylindrical portion 9A, and separated from one another by three cutouts 52. The cutouts 52 are shaped to allow passage of the plate-like projections 50 therethrough. The engaging lugs 43 have a sectional shape progressively thickening as the lugs extend in the circumferential direction. Thus, with turning of the engaging lugs 43 along the engaging recess 49, the lugs 43 become progressively tight fitted and locked between the plate-like projections 50 and continuous wall 51. The illustrated structure may be adapted such that, in the locked state, a pin or the like is inserted to prevent loosening. Loosening may be prevented by means of an O-ring fitted in the engaging recess 49 and an O-ring fitted between the engaging lugs 43 and continuous wall 51.

When attaching the left case 9 to the left frame 8, the plate-like projections 50 and cutouts 52 are placed in register, and the left case 9 is pushed in axially of the spool 3 whereby the engaging lugs 43 enter the engaging recess 49. In this state, the left case 9 is rotated about the axis of the spool 3 relative to the left frame 8. Consequently, the engaging lugs 43 become locked in the engaging recess 49 between the plate-like projections 50 and continuous wall 51. The left case 9 is now fixed in tight contact with the left frame 8, and this achieves automatic positioning of the bearing 20 secured to the left case 9. The left case 9 may be detached by reversing the above process.

A storage B for storing supplementary collars 53 for use in the centrifugal brake will be described next. As shown in FIG. 11, the left case 9 has a support projecting from an inner wall thereof and located in a pocket space E of the case 9. A support rod 54 is erected on the support, and a plurality of supplementary collars 53 are fitted on the support rod 54. The supplementary collars 53 are different in weight from the collars 37.

When a bait or the like is changed, the left case 9 is detached from the left frame 8, and the collars 37 are replaced with the supplementary collars 53 through the opening 8A to produce a braking force suited to a bait weight.

(7) The left case 9 may define a box-shaped storage space in the pocket E for storing the supplementary collars 53. The box-shaped storage space may be covered by an openable lid.

(8) The supplementary collars 53 may simply be stored in holes formed in a wall surface. In this case, the supplementary collars 53 may just be placed in the holes, or may be tight fitted in the holes to dispense with a mechanism for retaining the supplementary collars 53 therein.

(9) The left frame 8 defining the opening 8A may be adapted to accommodate the supplementary collars 53.

(10) The support rod 54 may be elongated to hold a plurality of supplementary collars 53, or a plurality of support rods 54 may be provided.

The various spaces noted above for storing the supplementary collars 53 are collectively called a storage B herein.

What is claimed is:
1. A baitcasting reel comprising:
  a frame;
  a case covering an outer part of said frame;
  a spool rotatable about a spool axis;
  a holder carrying a plurality of rods oriented in a direction normal to said spool axis and rotatable with said spool;
  a plurality of contact pieces slidably mounted on said rods respectively;

a stopper formed integrally with said holder for preventing detachment of said contact pieces from said holder;

a knob provided to enable said case to be rotatable about said spool axis, said knob being engageable with said frame;

a cylindrical braking member rotatable with said knob and disposed at a position outside a common locus of rotation of said contact pieces and contactable with said contact pieces, said braking member being positioned coaxially to said spool axis;

an inclined surface formed in an inner periphery of said braking member at an end thereof adjacent said spool, said inclined surface having a diameter progressively increasing in the direction toward said spool;

said inclined surface having a maximum diameter greater than radially outermost positions of said contact pieces limited by said stopper;

wherein said entire case is rendered movable by releasing engagement between said knob and said frame so as to expose substantially the entire outer part of said frame, thereby to allow access for adjustment of said contact pieces and replacement of said spool.

2. A baitcasting reel as defined in claim 1, wherein said inclined surface has a smaller diameter portion thereof gradually pushing outer ends of said contact pieces as said braking member approaches said contact pieces.

3. A baitcasting reel as defined in claim 1, wherein said inclined surface has an angle of inclination of 45 degrees or less with respect to a reference line parallel to said spool axis.

4. A baitcasting reel as defined in claim 1, wherein said braking member is mounted on an inner surface of a case detachably attached to a frame disposed adjacent said spool, said frame and said case including engaging pieces and lugs switchable between a tight engaging state and a loosened state through relative revolution therebetween about said spool axis.

5. A baitcasting reel as defined in claim 4, wherein said case includes a bearing for supporting said spool axis.

6. A baitcasting reel as defined in claim 1, wherein said braking member and said contact pieces are disposed adjacent an opening formed in said frame, a storage being formed in a position between said frame and a case detachably attached to said frame, for accommodating supplementary contact pieces acting as spares.

7. A baitcasting reel as defined in claim 1, wherein said braking men, her is formed of a metallic material.

8. A baitcasting reel as defined in claim 1, wherein said inclined surface has an arcuate shape bulging toward an interior space of said braking member.

9. A baitcasting reel as defined in claim 1, wherein said cover includes a pivot shaft extending substantially parallel to said spool axis and inserting into said frame, said covering being pivotable about said pivot shaft.

10. A baitcasting reel as defined in claim 1, wherein said contact pieces are formed of a resin material.

11. A baitcasting reel comprising:
a frame;
a case covering an outer part of said frame;
a holder carrying a plurality of rods oriented in a direction normal to a spool axis and rotatable with a spool;

a plurality of contact pieces slidably mounted on said rods respectively;

a stopper formed integrally with said holder for preventing detachment of said contact pieces from said holder;

a cylindrical braking member disposed at a position outside a common locus of rotation of said contact pieces and contactable with said contact pieces, said braking member being positioned coaxially to said spool axis;

an inclined surface formed in an inner periphery of said braking member at an end thereof adjacent said spool, said inclined surface having a diameter progressively increasing in the direction toward said spool; and said inclined surface having a maximum diameter greater than radially outermost positions of said contact pieces limited by said stopper.

12. A baitcasting reel as defined in claim 11, wherein said inclined surface has a smaller diameter portion thereof gradually pushing outer ends of said contact pieces as said braking member approaches said contact pieces.

13. A baitcasting reel as defined in claim 11, wherein said inclined surface has an angle of inclination of 45 degrees or less with respect to a reference line parallel to said spool axis.

14. A baitcasting reel as defined in claim 11, wherein said braking member is mounted on an inner surface of a case detachably attached to a frame disposed adjacent said spool, said frame and said case including engaging pieces and lugs switchable between a tight engaging state and a loosened state through relative revolution therebetween about said spool axis.

15. A baitcasting reel as defined claim 14, wherein said case includes a bearing for supporting said spool axis.

16. A baitcasting reel as defined in claim 11, wherein said braking member and said contact pieces are disposed adjacent an opening formed in said frame, a storage being formed in a position between said frame and a case detachably attached to said frame, for accommodating supplementary contact pieces acting as spares.

17. A baitcasting reel as defined in claim 11, wherein said braking member is formed of a metallic material.

18. A baitcasting reel as defined in claim 11, wherein said inclined surface has an arcuate shape bulging toward an interior space of said braking member.

19. A baitcasting reel as defined in claim 11, wherein said contact pieces are formed of a resin material.

20. A baitcasting reel as defined in claim 11, wherein said braking member is attached to an inner surface of said frame disposed the side of the spool.

21. A baitcasting reel as defined in claim 20, wherein said frame includes a bearing for supporting said spool axis.

22. A baitcasting reel comprising:
a frame;
a spool rotatable about a spool axis;
a holder carrying a plurality of rods oriented in a direction normal to said spool axis and rotatable with the spool;
a plurality of contact pieces slidably mounted on said rods respectively;
a stopper formed integrally with said holder for preventing detachment of said contact pieces from said holder;

a cylindrical braking member disposed at a position outside a common locus of rotation of said contact pieces and contactable with said contact pieces, said braking member being positioned coaxially to said spool axis;

a ring member screwed to said frame to be coaxial with said braking member, said ring member including an inner peripheral surface coextending with an inner peripheral surface of said braking member; and an inclined surface formed in said inner peripheral surface of said ring member at an end thereof adjacent said spool, said inclined surface having a diameter progressively increasing in the direction toward said spool.

* * * * *